(12) United States Patent
Ghiran et al.

(10) Patent No.: US 7,404,310 B1
(45) Date of Patent: Jul. 29, 2008

(54) MANDREL ANCHOR FOR TUBE BENDING

(75) Inventors: Mike M. Ghiran, Lake Orion, MI (US);
Wei Ji, Troy, MI (US); Paul D. Larsen,
Fenton, MI (US); David R. Jensen,
Swartz Creek, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/621,593

(22) Filed: Jan. 10, 2007

(51) Int. Cl.
*B21D 9/01* (2006.01)
*B23Q 3/14* (2006.01)

(52) U.S. Cl. .................. 72/466.2; 72/208; 72/149; 72/217; 269/48.1

(58) Field of Classification Search .......... 72/466.2, 72/208, 149, 370.05, 217, 370.08; 269/47–52
See application file for complete search history.

(56) References Cited

U.S. PATENT DOCUMENTS

| | | | | |
|---|---|---|---|---|
| 1,945,079 A * | 1/1934 | Riemenschneider | ......... | 72/341 |
| 2,357,123 A * | 8/1944 | Maxwell | .............. | 72/393 |
| 2,971,556 A * | 2/1961 | Armstrong et al. | ......... | 72/42 |
| 3,456,482 A * | 7/1969 | Cwik et al. | ............. | 72/466.2 |
| 3,747,394 A * | 7/1973 | Cunningham | ............. | 72/466 |
| 3,759,203 A * | 9/1973 | Frankenberg | ............. | 72/370.05 |
| 4,352,285 A * | 10/1982 | LaRue et al. | ............. | 72/466 |
| 4,436,574 A * | 3/1984 | Long et al. | ............. | 156/415 |
| 4,475,375 A * | 10/1984 | Hill | ............. | 72/466 |
| 4,493,203 A * | 1/1985 | Wheeler et al. | ............. | 72/369 |
| 5,564,303 A * | 10/1996 | Buchanan et al. | ......... | 72/466.2 |
| 5,823,031 A * | 10/1998 | Campbell et al. | ............. | 72/58 |
| 6,389,872 B1* | 5/2002 | Hanson | ............. | 72/466.2 |

FOREIGN PATENT DOCUMENTS

JP    59001026 A  *  1/1984

* cited by examiner

*Primary Examiner*—Dmitry Suhol

(57) ABSTRACT

A mandrel assembly is provided for insertion into a hollow tube to support the interior walls of the tube during bending of the tube in a tube bending apparatus. The mandrel assembly includes at least one mandrel segment that is adapted for positioning within the tube and has an exterior support surface for supporting the interior walls of the tube during bending. The mandrel segment is anchored at a fixed axial location within the tube by an anchoring device that is radially expandable and retractable between an expanded condition in which an anchor shoe is engaged with the interior wall of the tube and a retracted condition in which the anchor shoe is loose within the tube. A mandrel support rod is attached to the anchoring device for inserting and withdrawing the anchoring device into the tube when the anchor shoe is retracted.

10 Claims, 4 Drawing Sheets

MANDREL ANCHOR FOR TUBE BENDING

FIELD OF THE INVENTION

The present invention relates to an apparatus for bending a tube and more particularly a device for anchoring a mandrel within the tube for supporting the interior wall of the tube during bending of the tube.

BACKGROUND OF THE INVENTION

It is known in the manufacture of automobile frames and other tubular products to bend hollow tubes to a desired shape. One end of a tube is clamped in a clamp die. The free end of the tube is positioned adjacent a bend die around which the tube will be bent so that the bend die will define the curvature of the bend. A pressure die applies pressure to the tube to bend the tube around the bend die. When a tube is bent, basically two things happen. The tube wall on the outside of the curvature tends to collapse and thin out, and the tube wall on the inside of the tube curvature tends to compress and wrinkle.

In many applications, particularly when bending a thin wall tube or when bending around a small radius, a mandrel is inserted into the tube by a support rod before bending so that the presence of the mandrel will support the interior walls and thereby limit the amount of collapse and wrinkling encountered during the bending operation. The mandrel is often formed of ball segments that are connected together by swivel joints so that the mandrel can bend with the tube and support the tube walls, and yet the mandrel can be extracted from the bent tube after the bending.

In order to obtain a high quality bend, with minimal collapse and wrinkling, the mandrel support rod must consistently and reliably locate the mandrel at a precise location within the tube. However, it is known that during the pipe bending operation that part of the tube that is not clamped in the clamp die may become stretched axially and accordingly the bending part of the tube may be moving axially relative to the mandrel during the bending operation even as the support rod is trying to establish the mandrel at a precise location to support the tube during the bending.

Thus, it would be desirable to reliably anchor the mandrel at a predetermined location within the tube.

SUMMARY OF THE INVENTION

A mandrel assembly is provided for insertion into a hollow tube to support the interior walls of the tube during bending of the tube in a tube bending apparatus. The mandrel assembly includes at least one mandrel segment that is adapted for positioning within the tube and has an exterior support surface for supporting the interior walls of the tube during bending. The mandrel segment is anchored at a fixed axial location within the tube by an anchoring device that is radially expandable and retractable between an expanded condition in which an anchor shoe is engaged with the interior wall of the tube and a retracted condition in which the anchor shoe is loose within the tube. A mandrel support rod is attached to the anchoring device for inserting and withdrawing the anchoring device into the tube when the anchor shoe is retracted.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is exemplary in nature and is not intended to limit the invention, its application, or uses.

Figure 1:
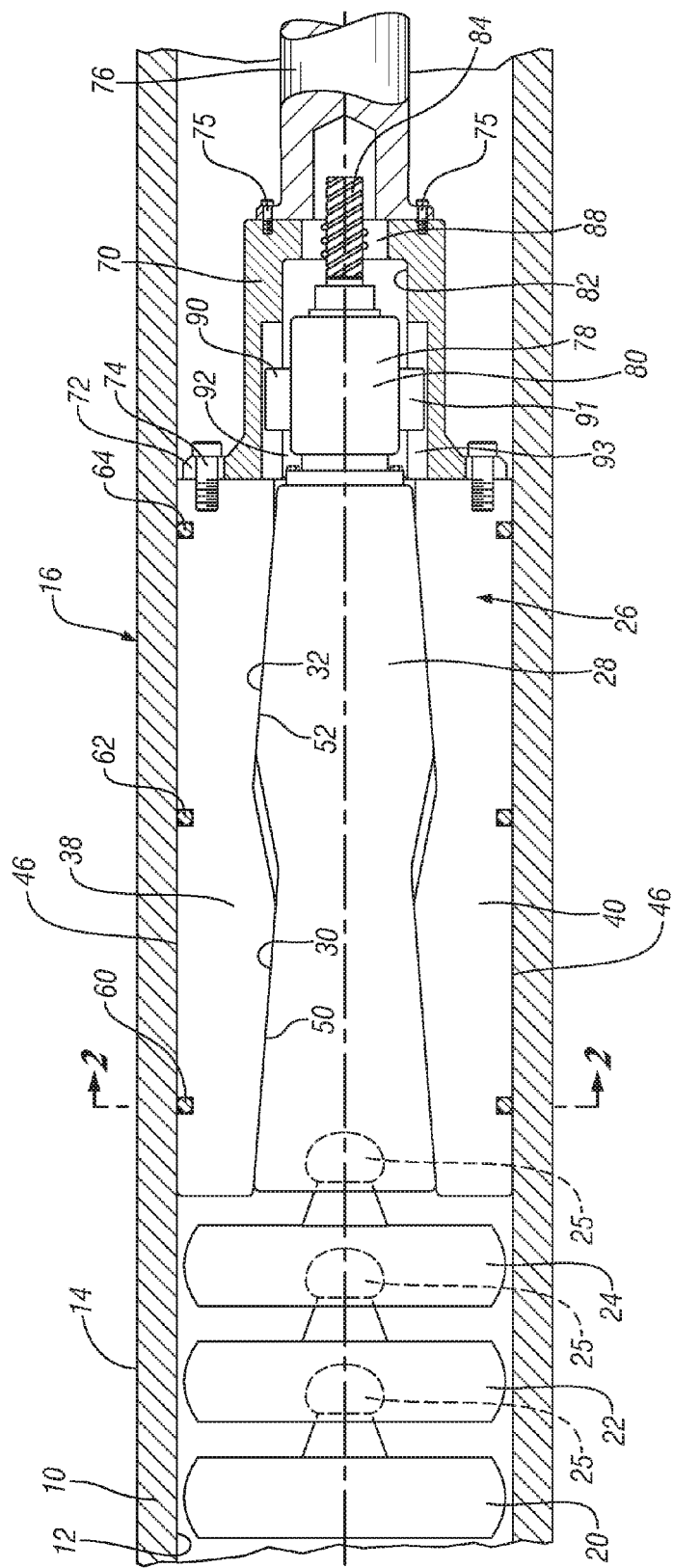
FIG. 1 is a longitudinal view of a tube and a tube bending mandrel have parts broken away and in section.

Referring to FIG. 1, a hollow tube 10 is to be bent in a tube bending apparatus. The tube has an interior wall 12 and an exterior wall 14. The right hand end of the tube 10 will be clamped in a clamping die, not shown, to hold the right hand end stationary. The left hand end of the tube will be engaged by a bend die and a pressure die for bending the tube to a desired radius of curvature.

FIG. 1 shows a mandrel assembly, generally indicated at 16, that is positioned within the tube 10 to support the interior wall 12 during the bending operation. The mandrel assembly 16 includes a plurality of mandrel ball segments 20, 22 and 24 that are arranged in series, end-to-end, and joined together by ball swivels 25 so that the ball segments can flex relative one another to accommodate bending of the tube 10. Upon bending of the tube 10, the ball segments will support the interior walls of the tube 10 against wrinkling and collapse.

Figure 2:
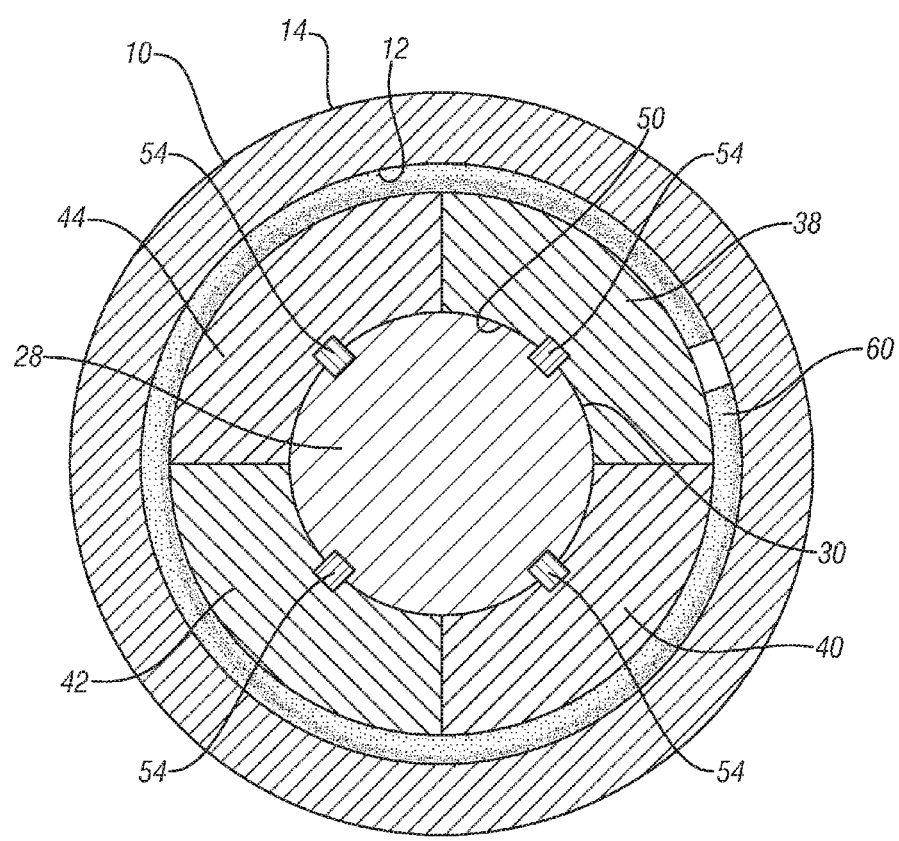
FIG. 2 is a section view taken in the direction of arrows 2-2 of FIG. 1.

Mandrel assembly 16 also includes an anchor device, generally indicated at 26, that includes a central cam rod 28 that has a cone shaped cam surface 30 at the left end and a cone shaped cam surface 32 at the right end. The anchor device 26 also includes anchor shoes 38, 40, 42, and 44 that are arrayed around the circumference of the central cam rod 28, as best seen in FIG. 2. Each of the anchor shoes has an outer surface 46 that faces the interior wall 12 of the tube 10. As best seen in FIG. 1, the anchor shoe 38 has a left hand cam surface 50 that mates with the cam surface 30 of the central cam rod 28 and a right hand cam surface 52 that mates with the cam surface 32 of the central cam rod 32. A rectangular key 54, FIG. 2, is seated within key way slots provided on the central cam rod 28 and the anchor shoe 38 so that the anchor shoe 38 can move axially relative to the central cam rod 28. Each of the other anchor shoes 40, 42 and 44 has cam surfaces and rectangular keys similar to the anchor shoe 38. Retaining rings 60, 62 and 64 are seated within recessed grooves that encircle the anchor shoes 38, 40, 42 and 44 to retain the anchor shoes on the central cam rod 28 but enable the anchor shoes to expand outwardly and retract inwardly relative one another. When seated in the recessed grooves, the outside diameter of the retaining rings 60, 62 and 64 is less that the outside diameter of the anchor shoes 38, 40, 42 and 44.

The anchor shoes 38 are connected to a drive housing 70 by a bolt 74 that is threaded tightly into the end of the anchor shoe 38 but rides loosely within a radial extending slot 72 of the drive housing 70 so that the anchor shoe 38 can move radially relative to the drive housing 70. The anchor shoes 40, 42 and 44 are similarly connected to the drive housing 70.

The drive housing 70 is bolted by bolts 75 to a support rod 76 that extends through the tube 10 and is anchored to the tube bending machine. The support rod 76 is used to insert the mandrel assembly 16 into the tube 10 and remove the mandrel assembly 16 from the tube 10 after the bending is completed.

A drive mechanism, generally indicated at 78, is provided for moving the anchor shoes axially relative to the central cam rod 28. Motor 80 is housed within a cavity 82 of the drive housing 70 and the left hand end of the motor 80 is bolted to the central cam rod 28. Motor 80 drives a threaded shaft 84. A nut 88 is captured in the drive housing 70 and meshes with the threaded shaft 84. The motor 80 has wings 90 and 91 that ride in slots 92 and 93 of the drive housing 70 so that the motor 80 is fixed against rotation. The motor 80 is electrically connected to motor control circuitry by electrical conductors that are not shown in the drawing.

In operation, it will be understood that energizing the motor 80 will rotate the threaded shaft 84. The nut 88 cannot rotate because it is captured in the drive housing 70 which is in turn bolted to the support rod 76. Accordingly, the motor 80 will be caused to move axially to the left or the right, and in turn will move the central cam rod 28 to the left or the right. As seen in FIG. 1, moving the central cam rod 28 to the left will move the cam surfaces 30 and 32 to the left which will in turn allow the anchor shoes 38, 40, 42 and 44 to be retracted radially inwardly away from contact with the internal wall 12 of tube 10 by the spring action of the retaining rings 60, 62 and 64. On the other hand, energizing the motor 80 to move the central cam rod 28 to the right will force the anchor shoes 38, 40, 42 and 44 radially outward to friction clamp the outer surface of the anchor shoes against the interior wall 12 of tube and thereby anchor the axial position of ball segments 20, 22, and 24 firmly within the tube in readiness for the tube forming operation.

Figure 3:
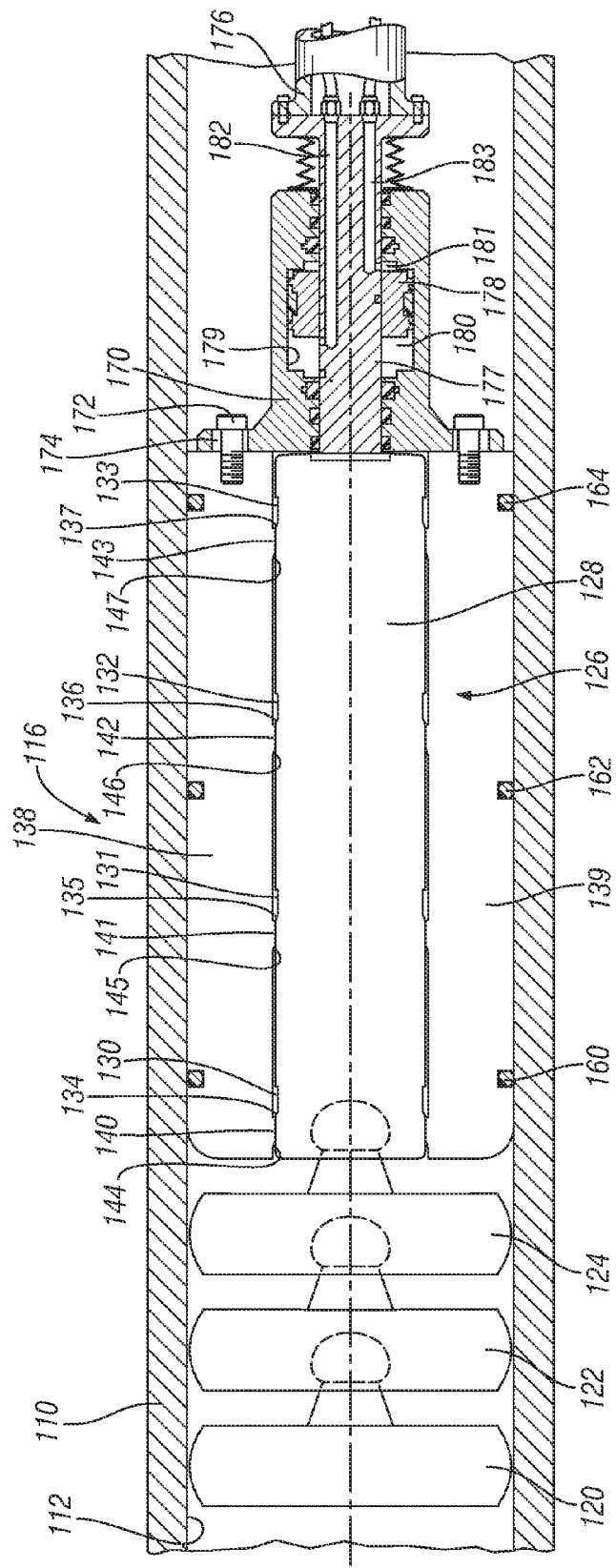
FIG. 3 is a view similar to FIG. 1 but showing a second embodiment.

FIG. 3 shows another embodiment of the mandrel assembly, generally indicated at 116. The mandrel assembly 116 includes mandrel ball segments 120, 122 and 124 that are joined together by ball swivels so that the ball segments can flex relative one another to accommodate bending of the tube 110.

Mandrel assembly 116 also includes an anchor device, generally indicated at 126, that includes a central cam rod 128 that has annular grooves 130, 131, 132 and 133 spaced along its length. Each of the grooves has a cone-shaped inclined cam surface, designated respectively as 134, 135, 136 and 137. The anchor device 126 also includes a plurality of anchor shoes that are arrayed around the central cam rod 128, two of which are shown in FIG. 3 at 138 and 139. As best seen in FIG. 3, the anchor shoe 138 has abutments 140, 141, 142 and 143 which register with the annular grooves 130, 131, 132 and 133 of the central cam rod 128. Each of these abutments has an inclined cam surface, designated respectively at 144, 145, 146 and 147.

It will be understood that each of the other anchor shoes has cam surfaces similar to the anchor shoe 138. Retaining rings 160, 162 and 164 are seated within grooves that encircle the anchor shoes to retain the anchor shoes on the central cam rod 28 but enable the anchor shoes to expand outwardly and retract inwardly relative one another.

The anchor shoe 138 is connected to a drive housing 170 by a bolt 172 that is threaded tightly into the end of the anchor shoe 138 but rides loosely within a radial extending slot 174 of the drive housing 170 so that the anchor shoe 138 can move radially relative to the drive housing 170. Each of the other anchor shoes is similarly connected to the drive housing 170 to permit radial movement.

A support rod 176 is anchored to the tube bending machine. The support rod 176 is attached to the central cam rod 128 by a drive rod 177. A piston 178 is fixedly attached onto the drive rod 177 and is seated within a bore 179 provided in the drive housing 170. The piston 178 divides the bore 179 into a chamber 180 and a chamber 181 that are respectively connected to a source of hydraulic fluid by passages 182 and 183.

In operation, it will be understood that in FIG. 3 pressurized hydraulic fluid has been communicated to the chamber 180 and drained from the chamber 181 so that the drive housing 170 has been pushed to the left in FIG. 3. Accordingly, the leftward movement of the anchor shoe 138 has caused the cam surfaces 144, 145, 146 and 147 of the anchor shoes to have climbed up the cam surfaces 134, 135, 136 and 137 of the central cam rod 128 so that the abutments 140, 141, 142 and 143 dwell on the outer surface of the central cam rod 128 and the anchor shoes are forcibly clamped against the interior walls of the tube, not shown. After the tube bending operation is completed, the shoes will be radially retracted by communicating pressurized hydraulic fluid to the chamber 181 and draining the chamber 180 so that the drive housing 170 will be moved rightwardly and will in turn move the anchor shoes rightwardly. The cam surface 144, 145, 146 and 147 of the anchor shoes will ride down the cam surfaces 134, 135, 136 and 137 of the central cam rod 128 so that the abutments 140, 141, 142 and 143 will dwell within the grooves 130, 131, 132 and 133 and the retaining rings 160 and 162 and 164 will fully retract the anchor shoes radially.

Figure 4:
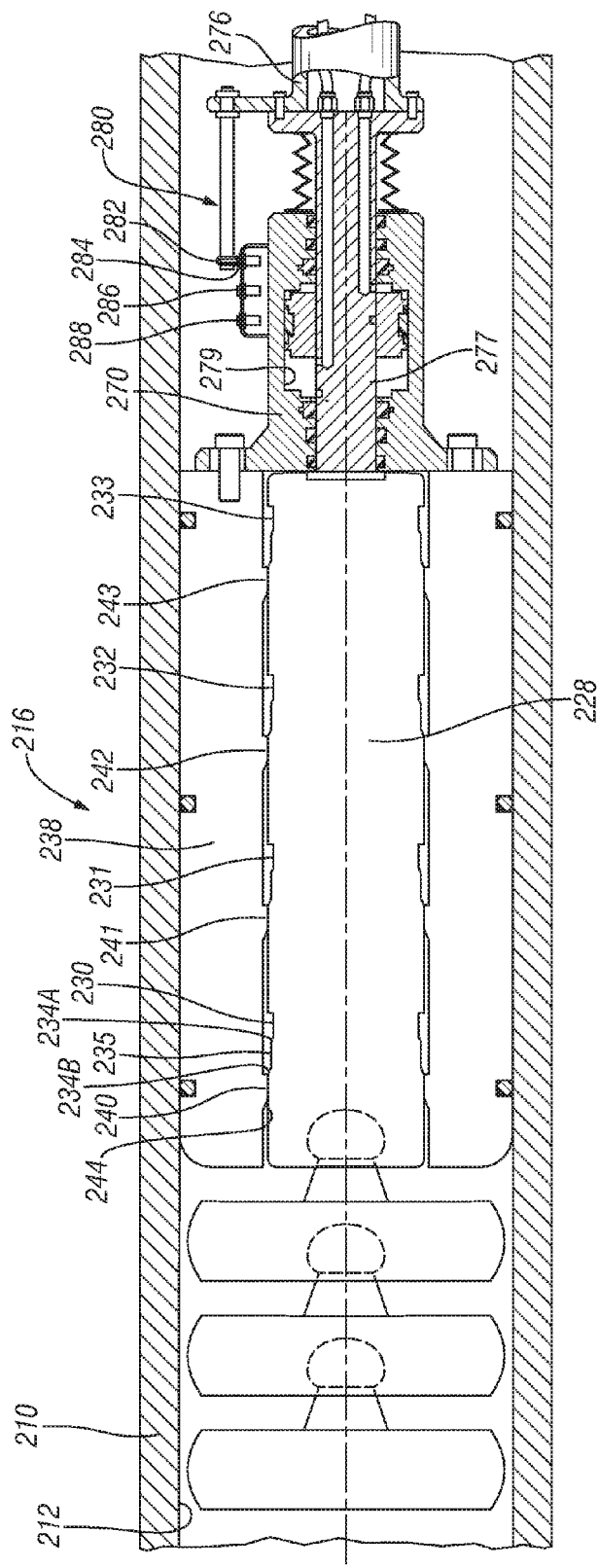
FIG. 4 is a view similar to FIG. 1 but showing a third embodiment.

Referring to FIG. 4, another embodiment of the invention is shown and is constructed generally the same as the embodiment of FIG. 3. However, in FIG. 4 a central cam rod 228 has annular grooves 230, 231, 232 and 233 spaced along its length, and the anchor shoe 238 has corresponding abutments 240, 241, 242 and 243. Each of the grooves has a two-step cone-shaped cam surface separated by a land. For example, the annular groove 230 has a lower or radially inner step cam surface 234A and an upper radially outer step cam surface 234B that are separated by a land 235. The anchor shoe 238 has abutment 240 that registers with the annular grooves 230 and has a cam surface 244 that rides on the cam surfaces 234A and 234B. FIG. 4 shows the anchor shoes pushed fully to the left so that the abutment 240 dwells on the outer surface of the central cam rod 228 and the anchor shoes are fully extended to engage with the inner wall 212 of tube 210. As the anchor shoes are moved to the right, the abutment 240 and its cam surface 244 will ride down the incline of outer-step cam surface 234B, then dwell on the land 235, and then further movement of the right will cause the abutment 240 and its cam surface 244 to ride down the inner-step cam surface 234A, and then the abutment 240 will dwell at the bottom of the groove 230 where the anchor shoes are fully retracted away from engagement with the interior wall 212 of the tube 210.

FIG. 4 also shows a transducer, generally indicated at 280, for instrumenting the mandrel assembly 216. The transducer 280 includes a follower 282 that is mounted on the support rod 276 and which makes electrical contact with one of three electrical contacts 284, 286 and 288 located on the drive housing 270. The transducer 280 will thus provide data identifying the relative axial position between the anchor shoes and the central rod. Any commercially-available linear transducer may be used for this purpose.

Thus, it is seen that the mandrel assemblies of the three embodiments shown in the drawings each function to clamp to the interior wall of the tube and thereby establish the ball segments at a fixed axial location within the tube that is to be bent. The embodiment of FIG. 1 has a continuously-inclined cam surface that is infinitely adjustable as each increment of axial movement of the anchor shoes will move the anchor shoes a corresponding increment of movement radially inward and outward. The second embodiment of FIG. 3 is designed to be a two-step clamp that is either clamped or released. The third embodiment of FIG. 4 is designed to be a three-step clamp that is either clamped or released, but also has an intermediate position. The embodiment of FIG. 4 may be particularly useful if the mandrel assembly is to be used in the bending of two different tube diameters. For example, it the tube has different inside diameters along its length, the anchor device can clamp at either the full expanded condition or at the intermediate condition.

The foregoing description of the invention is merely exemplary in nature and, thus, variations thereof are intended to be within the scope of the invention. For example, the cam surfaces acting between the anchor shoes and the central cam rod may be arranged circumferentially instead of axially as shown in the drawings, in which case the drive mechanism will be configured to induce relative rotary movement between the anchor shoes and the central cam rod. In addition, although the drawings show the example of a round tube that is to be bent, it will be understood that the mandrel assembly of this invention may also be employed to bend tubes of other cross sections by providing anchor shoes that have an outer surface shaped for clamping the interior wall shape of the particular non-circular tube shape. In addition, it will be understood that the clamping action can be powered by any type of actuator, such as an electric motor, a hydraulic or pneumatic cylinder or motor, or by a mechanical drive mechanism.

What is claimed is:

1. A mandrel assembly for insertion into a hollow tube to support the interior walls of the tube during bending of the tube, comprising:
   a mandrel support rod for inserting and withdrawing the mandrel assembly into the tube;
   a cam rod carried by the mandrel support rod and having cam surfaces thereon;
   a plurality of mandrel segments carried by the cam rod and serially arranged and flexibly connected together for flexibly supporting the interior walls of the tube during bending;
   a plurality of anchor shoes arrayed around the cam rod and having cam surfaces thereon that engage with the cam surface of the cam rod;
   and a drive mechanism acting on the anchor shoes to move the anchor shoes relative the cam rod so that the anchor shoes selectively move radially outward to engage with the interior walls of the tube and move radially inward away from the interior walls of the tube.

2. The mandrel assembly of claim 1 in which a plurality of retaining rings encircle the plurality of anchor shoes to urge the anchor shoes radially inward to a retracted position away from engagement with the interior walls of the tube.

3. The mandrel assembly of claim 1 in which the cam surfaces have a constant incline so that each increment of movement of the anchor shoes relative the cam rod will cause a corresponding increment of the radial movement of the anchor shoe relative the interior wall of the tube.

4. The mandrel assembly of claim 1 in which the cam surfaces have at least one portion of incline so that each increment of movement of the anchor shoes relative the cam rod will cause a corresponding increment of the radial movement of the anchor shoe relative the interior wall of the tube and the cam surfaces have at least one portion of dwell so that the anchor shoe will be poised at a radial position during movement of the anchor shoes relative the cam rod.

5. The mandrel assembly of claim 1 in which the cam surfaces of the anchor shoes and the cam rod have an inclined portion causing the anchor shoes to move radially upon relative movement between the anchor shoes and the cam rod, and an outer dwell portion corresponding to a maximum radial outward position of the anchors.

6. The mandrel assembly of claim 5 in which the cam surfaces have an inner dwell portion corresponding to a most radial inward position of the anchor shoes in which the anchor shoes are spaced away from engagement with the interior wall of the tube.

7. The mandrel assembly of claim 6 in which the cam surfaces have an additional dwell portion that is intermediate the inner dwell portion and the outer dwell portion.

8. The mandrel assembly of claim 1 in which the drive mechanism is comprised of a hydraulic device that is energizable to move the anchor shoes relative the cam rod.

9. The mandrel assembly of claim 1 in which the drive mechanism is comprised of an electric motor that is energizable to move the anchor shoes relative the cam rod.

10. A mandrel assembly for insertion into a hollow tube to support the interior walls of the tube during bending of the tube, comprising:
   a mandrel support rod for inserting and withdrawing the mandrel assembly into the tube;
   a cam rod carried by the mandrel support rod and having axially inclined cam surfaces thereon;
   a plurality of mandrel segments carried by the cam rod and serially arranged and flexibly connected together for flexibly supporting the interior walls of the tube during bending;
   a plurality of anchor shoes arrayed around the cam rod and having axially inclined cam surfaces thereon that engage with the cam surfaces of the cam rod;
   and a drive mechanism acting on the anchor shoes to move the anchor shoes axially relative the cam rod so that the anchor shoes selectively move radially outward to engage with the interior walls of the tube and move radially inward away from the interior walls of the tube, thereby respectively anchoring the mandrel segments at a fixed axial location within the tube or withdrawing from engagement to permit the withdrawal of the mandrel assembly from the tube.

* * * * *